United States Patent Office 2,769,776
Patented Nov. 6, 1956

2,769,776

METHOD OF MAKING A PRODUCT CONTAINING URANIUM 237

Allen F. Reid, New York, N. Y., assignor to the United States of America as represented by the United States Atomic Energy Commission No Drawing. Application February 7, 1946,
Serial No. 646,201

7 Claims. (Cl. 204—154)

This invention relates to a method of making a tracer composition for uranium containing the naturally occurring isotopes, which composition contains uranium 237 (the numeral indicating atomic weight) as the tracer and in which the ratio of this isotope to the isotopes of natural uranium is increased over that obtainable by ordinary methods.

Uranium 235 has proved to be useful as a source of atomic energy. A process has been developed for enriching uranium hexafluoride with respect to uranium 235 which involves separating the isotopic species of uranium hexafluoride, $U^{235}F_6$ from $U^{238}F_6$, by diffusion of the gaseous compound through porous, permeable metal membranes. In this process the need may arise for a tracer to determine the efficiency of individual diffuser elements. Thus, a plurality of such elements may discharge their enriched product into a common output line. If one of the elements is not operating at the expected efficiency, analysis of the product will indicate a decreased overall efficiency but will not indicate which element is at fault. This may be determined by feeding a tracer to the several elements, in separate trials, and determining the tracer in the product. It is apparent that the tracer must be an isotope of uranium other than the naturally occurring ones which are uranium 234, 235 and 238.

In the connection with this process it is of interest to determine whether exchange of uranium isotopes takes place between $UF_6$ and uranium compounds such as $UF_4$ with which the former may come in contact, a reaction which would seriously interfere with enrichment. This possibility may be investigated by means of the tracer of the present invention. Its use is also indicated in physiological studies of uranium in the human body, and generally in studying reactions involving uranium.

One artifically created radioactive isotope of uranium of interest as a tracer is uranium 237 which emits a beta ray that can be readily measured by means of a Geiger-Muller counter.

The usefulness of a tracer depends on the accuracy with which it may be determined. The accuracy increases with the total number of counts made which in turn depends on the inherent emitting characteristics of the tracer, the counting time, the total weight of material available for analysis and the concentration of the tracer in the material, hence the purity in which the latter may be made available. For example, if a tracer composition containing $U^{237}F_6$ is added to ordinary $UF_6$ or $UF_6$ which has been enriched with respect to uranium 235, and a given weight of the mixture is subsequently analyzed to determine uranium 237, one of the factors on which the accuracy of the determination will depend is the ratio of uranium 237 to the other isotopes of uranium in the tracer composition. Increase of this ratio will permit increased accuracy; or the used of a shorter counting time or of smaller amounts of the material to be analyzed with maintenance of a desirable accuracy.

In general, artificially radioactive isotopes may be made by bombarding a suitable parent substance with a particular kind of sub-atomic particle moving at a certain speed. The difficulty is that the desired isotope is produced in very low concentration unless bombardment is carried on for an impracticably long time. Of course it is not possible to separate the radioactive isotope by any of the commonplace physical or chemical methods because the various isotopes are too closely similar in their physical and chemical characteristics.

It is therefore an object of the present invention to provide a method of making a tracer composition for uranium containing the naturally occurring isotopes, which composition contains uranium 237 as the tracer and in which there is an increased ratio of this isotope to the isotopes of natural uranium.

According to the present invention such a tracer composition may be made by bombarding an ordinary uranium halide, preferably those of higher valence and particularly uranium hexafluoride, with high-velocity sub-atomic particles such as deuterons or neutrons and recovering from the bombarded mass a substance chemically distinct from said uranium halide containing uranium 237 in said increased ratio. The nuclear reactions with deuterons and with neutrons respectively are:

(1)  $U^{238} + H^2 \rightarrow U^{237} + H^3$ (or $H^1 + 2n$)
(2)  $U^{238} + n \rightarrow U^{237} + 2n$ Apparently, as the uranium 237 atoms are formed they are knocked out of combination in the uranium halide. Under the conditions of bombardment a limited amount of the uranium halide undergoes chemical change. The freed uranium 237 atoms tend to concentrate in the new substance which is formed and this substance may be separated from the uranium halide by ordinary physical or chemical methods.

In the case of uranium hexafluoride the chemical change takes place probably according to the reaction:

$$UF_6 \rightarrow UF_4 + F_2$$

Separation is preferably effected by evaporating the uranium hexafluoride and recovering the residue. It has been found that a residue may be recovered which contains more than 50% of the uranium 237 which has been formed and in which the ratio of uranium 237 to the other isotopes of uranium ranges from $1:10^4$ to $1:10^6$. Other modes of separation may be used and may include, for example, extracting the uranium hexafluoride with a solvent such as an alkyl fluorocarbon, $C_7H_{16}$, or water, and recovering the insoluble remainder.

The invention will be described with particular reference to a specific embodiment in which uranium hexafluoride is bombarded with high-velocity neutrons.

A stream of fast-moving neutrons is generated by utilizing the reaction between beryllium and deuterium:

$$Be^9 + H^2 \rightarrow B^{10} + n$$

Thus, a target consisting of a metal base bonded to a layer of elementary beryllium is placed within the cyclotron. A sealed container containing uranium hexafluoride is positioned in the path of the neutron beam generated from the beryllium. Thus, the beryllium is bombarded with deuterons and in turn generates a stream of neutrons which bombard the uranium hexafluoride to produce uranium 237. The container should best consist of a material which will not be injured by the neutron bombardment nor decrease the efficiency of the production of uranium 237. Suitable materials for the container have been found to be aluminum, copper, quartz and soft glass. The target is then exposed to a beam of 7 m. e. v. deuterons having an intensity of about 2 kilowatts for about 7 hours. It has been found that under these conditions an activity of about 2 microcuries per gram may be obtained. Under other conditions other activities may be obtained.

At the end of the bombardment the container is removed from the cyclotron and coupled to a condenser apparatus, such as that described in an application of E. T. Booth, R. B. Pontius, B. A. Jacobsohn and C. B. Slade, S. N. 534,652, filed May 8, 1944. The container is heated. Uranium hexafluoride sublimes and is removed leaving a small amount of a solid residue in the container. The residue is dissolved in concentrated nitric acid and may be used as a source of uranium 237, if desired after chemical treatment or the like to convert it to any desired compound. For example, treatment with fluorine may be employed to convert the residue to uranium hexafluoride. The substance recovered contains more than 50% of the uranium 237 atoms produced and contains a very small percentage of the weight of uranium in the container originally. The ratio of uranium 237 to the sum of all other isotopes of uranium in this substance is roughly about $1:10^5$.

This invention is therefore a distinct step forward in the art of producing radioactive isotopes, for by using the methods described herein preparations of uranium 237 may be made in which the ratio of this isotope to the sum of all other isotopes of uranium is about 1000 times greater than that obtainable by ordinary methods; and this may be achieved without appreciably greater expenditures in energy, equipment and time.

Since many embodiments might be made in the present invention and since many changes might be made in the embodiment described, it is to be understood that the foregoing description is to interpreted as illustrative only and not in a limiting sense.

I claim:

1. The method of making a product containing uranium 237 which comprises bombarding a uranium halide containing uranium 238 with high-velocity sub-atomic particles selected from the group consisting of deuterons and neutrons and recovering as the product from the bombarded mass a substance chemically distinct from said uranium halide.

2. The method of making a product containing uranium 237 which comprises bombarding uranium hexafluoride containing uranium 238 with high-velocity sub-atomic particles selected from the group consisting of deuterons and neutrons and recovering as the product from the bombarded mass a substance chemically distinct from uranium hexafluoride.

3. The method of making a product containing uranium 237 which comprises bombarding uranium hexafluoride containing uranium 238 with high-velocity deuterons and recovering as the product from the bombarded mass a substance chemically distinct from uranium hexafluoride.

4. The method of making a product containing uranium 237 which comprises bombarding uranium hexafluoride containing uranium 238 with high-velocity neutrons and recovering as the product from the bombarded mass a substance chemically distinct from uranium hexafluoride.

5. The method of making a product containing uranium 237 which comprises bombarding uranium hexafluoride containing uranium 238 with high-velocity neutrons, separating uranium hexafluoride from the bombarded mass and recovering the remainder as the product.

6. The method of making a product containing uranium 237 which comprises bombarding uranium hexafluoride containing uranium 238 with high-velocity deuterons, and evaporating uranium hexafluoride from the bombarded mass to leave said product as a residue.

7. The method of making a product containing uranium 237 which comprises bombarding uranium hexafluoride containing uranium 238 with high-velocity neutrons, and evaporating uranium hexafluoride from the bombarded mass to leave said product as a residue.

References Cited in the file of this patent

UNITED STATES PATENTS

| | | |
|---|---|---|
| 2,251,190 | Kallman et al. | July 29, 1941 |

FOREIGN PATENTS

| | | |
|---|---|---|
| 440,023 | Great Britain | Dec. 12, 1935 |
| 662,036 | Germany | July 2, 1938 |

OTHER REFERENCES

Livingston et al.: "Neutrons from Beryllium by Deutons," Phys. Rev., vol. 44, 782–3, Nov. 1 (1933). (Copy may be found in Patent Office Library.)

Fermi et al.: "Artificial Radioactivity Produced by Neutron Bombardment," Proc. Roy. Soc. (London), Series A, No. 857, vol. 146, p. 497, September (1934). (Copy may be found in Patent Office Library.)

Amaldi et al.: "Neutron Yields from Artificial Sources," Phys. Rev., vol. 51, pp. 890–912, June 1 (1937). (Copy may be found in Patent Office Library.)

Nier: Phy. Rev. 55, 150–153 (1939). (Copy in Patent Office Library.)

McMillan: Phy. Rev. 58, 178 (1940). (Copy in Patent Office Library.)

Nishina et al.: Phy. Rev. 57, 1182 (1940). (Copy in Patent Office Library.)

Gant et al.: "Deuteron-Induced Fission in Uranium and Thorium," Proc. Roy. Soc. (London), Series A, vol. 178, pp. 478–492 (1941). (Copy may be found in Patent Office Library.)

Pollard and Davidson: "Applied Nuclear Physics," p. 86, John Wiley & Sons (1942). (Copy may be found in Patent Office Library.)

Engineering, vol. 156, pp. 223–5 (1943).

Engineering, vol. 156, pp. 201–3 (1943). (Copies may be found in Patent Office Library.)

Engineering, vol. 160, No. 4153, pp. 134–5 (1945).

Wahl et al.: AECD–1830, 2 pages, date of manuscript April 13, 1942, date declassified December 17, 1947. (Copy in Patent Office Library.)